US012811033B2

(12) United States Patent
Bauer et al.

(10) Patent No.: US 12,811,033 B2
(45) Date of Patent: Nov. 24, 2026

(54) METHOD FOR PRODUCING A HIGH-VOLTAGE INSULATOR, AND HIGH-VOLTAGE INSULATOR

(71) Applicant: Maschinenfabrik Reinhausen GmbH, Regensburg (DE)

(72) Inventors: Thomas Bauer, Nittendorf (DE); Sergej Kovalenko, Koefering (DE); Simon Lautenschlager, Wald (DE)

(73) Assignee: TRENCH GROUP GMBH, Berlin (DE)

( * ) Notice: Subject to any disclaimer, the term of this patent is extended or adjusted under 35 U.S.C. 154(b) by 229 days.

(21) Appl. No.: 18/711,175

(22) PCT Filed: Oct. 12, 2022

(86) PCT No.: PCT/EP2022/078332
§ 371 (c)(1),
(2) Date: May 17, 2024

(87) PCT Pub. No.: WO2023/088615
PCT Pub. Date: May 25, 2023

(65) Prior Publication Data
US 2025/0014785 A1 Jan. 9, 2025

(30) Foreign Application Priority Data
Nov. 19, 2021 (DE) ..................... 10 2021 130 320.6

(51) Int. Cl.
*H01B 19/00* (2006.01)
*H01B 17/32* (2006.01)
*H01B 17/58* (2006.01)
*H01B 19/02* (2006.01)

(52) U.S. Cl.
CPC ............. *H01B 19/00* (2013.01); *H01B 17/58* (2013.01)

(58) Field of Classification Search
CPC ........ H01B 19/00; H01B 19/02; H01B 17/58; H01B 17/32; H01B 17/56; H01B 17/583; H01B 17/325
See application file for complete search history.

(56) References Cited

U.S. PATENT DOCUMENTS

| | | | | |
|---|---|---|---|---|
| 4,355,200 | A | 10/1982 | Wheeler et al. | |
| 5,594,827 | A * | 1/1997 | Joulie | G02B 6/442 174/80 |
| 5,973,272 | A * | 10/1999 | Levillain | H01B 17/32 29/729 |
| 6,284,082 | B1 | 9/2001 | Schuler et al. | |
| 2021/0335523 | A1 | 10/2021 | Kruska et al. | |

FOREIGN PATENT DOCUMENTS

| | | | |
|---|---|---|---|
| DE | 2545413 | A1 | 4/1977 |
| DE | 3640180 | A1 | 6/1988 |
| DE | 19635362 | C1 | 12/1997 |
| DE | 102010050684 | A1 | 5/2012 |

* cited by examiner

*Primary Examiner* — Timothy J Thompson
*Assistant Examiner* — Amol H Patel
(74) *Attorney, Agent, or Firm* — LEYDIG, VOIT & MAYER, LTD.

(57) ABSTRACT

A method produces a high-voltage insulator. The method includes: providing a substantially rotationally symmetrical insulating pipe; applying an insulating sheath to the insulating pipe; fastening at least one flange to at least one end of the insulating pipe; and applying at least one insulating strip circumferentially to the insulating pipe.

13 Claims, 5 Drawing Sheets

METHOD FOR PRODUCING A HIGH-VOLTAGE INSULATOR, AND HIGH-VOLTAGE INSULATOR

CROSS REFERENCE TO RELATED APPLICATIONS

This application is a U.S. National Phase application under 35 U.S.C. § 371 of International Application No. PCT/EP2022/078332, filed on Oct. 12, 2022, and claims benefit to German Patent Application No. DE 10 2021 130 320.6, filed on Nov. 19, 2021. The International Application was published in German on Nov. 18, 2022 as WO 2023/088615 A1 under PCT Article 21(2).

FIELD

The present disclosure relates to a method for producing a high-voltage insulator and to a corresponding high-voltage insulator.

BACKGROUND

High-voltage insulators usually have an insulating pipe made of glass-fiber-reinforced plastic, a shielding made of silicone over the insulating pipe, and flanges connected to the insulating pipe and serving as a fastening device.

High-voltage insulators for high-voltage devices, such as transformers for example, are exposed to heavy physical and chemical stresses during their service life. These stresses can be electrical or mechanical in nature and are affected by local ambient and environmental conditions. Electrical partial discharges, which can damage the insulating material and shorten the service life of the high-voltage insulator, can occur particularly in the vicinity of the flanges, in the so-called triple-point region in which the insulating pipe, the silicone shielding and the flange meet each other, due to the high field strength prevailing in this region.

SUMMARY

In an embodiment, the present disclosure provides a method for producing a high-voltage insulator. The method includes: providing a substantially rotationally symmetrical insulating pipe; applying an insulating sheath to the insulating pipe; fastening at least one flange to at least one end of the insulating pipe; and applying at least one insulating strip circumferentially to the insulating pipe.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
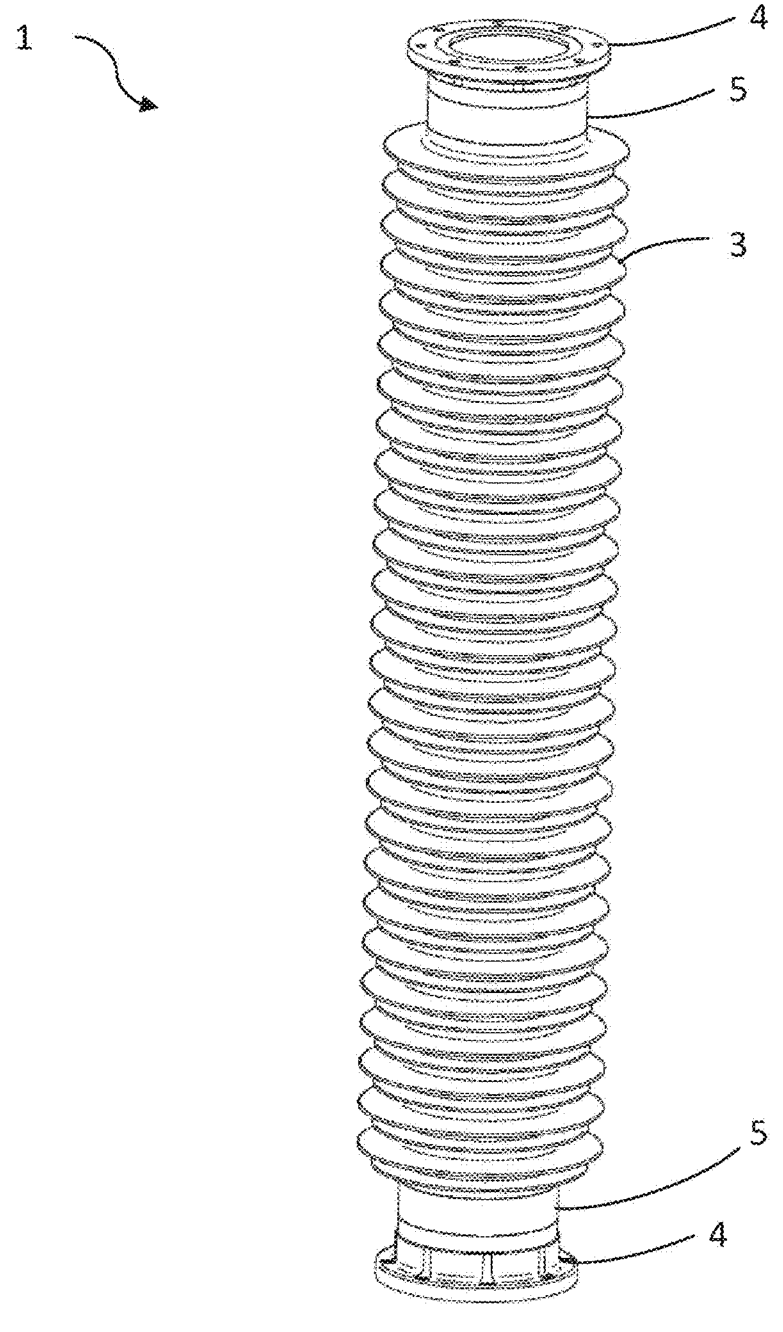
FIG. 1 shows an exemplary embodiment of a high-voltage insulator according to the improved concept of the present disclosure.

Aspects of the present disclosure specify an improved concept for a high-voltage insulator, which has a long service life and can be produced with little expenditure.

A method for producing a high-voltage insulator is specified according to a first aspect of the improved concept. Here, a substantially rotationally symmetrical insulating pipe is provided, an insulating sheath is applied to the insulating pipe, at least one flange is fastened to at least one end of the insulating pipe and then at least one insulating strip is applied circumferentially to the insulating pipe.

According to one embodiment of the method, the high-voltage insulator is vulcanized, preferably in a furnace designed for this purpose, in a next step.

The insulating sheath has several shielding rings which extend radially outward and serve to extend the creepage distance.

The flange is fastened using an adhesive, for example.

According to one embodiment, the insulating pipe is formed from a first insulating material, the insulating sheath and the at least one insulating strip are formed from a second insulating material and the at least one flange is formed from a third material.

According to one embodiment, the first insulating material is formed as a glass-fiber-reinforced plastic. The insulating pipe is preferably produced from glass-fiber-reinforced plastic according to known winding methods, wherein fiber elements soaked in resin are wound onto a rotating winding core in several layers.

According to a further embodiment, the second insulating material is formed as silicone, preferably as hot-crosslinking (HTV) silicone rubber. Forming the insulating sheath and the insulating strip from the same material, namely HTV silicone, offers the advantage of a higher resistance to leakage currents and accompanying this a higher flame resistance for the high-voltage insulator.

According to a further embodiment, the third material, from which the flange is formed, is formed as a metal, preferably as aluminum.

According to a further embodiment, the insulating sheath is formed from liquid silicone and the at least one insulating strip is formed from silicone rubber.

According to a further embodiment, the insulating sheath is applied in a first region of the insulating pipe, the at least one flange is fastened in a second region of the insulating pipe and the at least one insulating strip is applied in a third region of the insulating pipe. Here, the third region extends at least in part over the first region and/or the second region with respect to a longitudinal axis L of the insulating pipe, and the first region and the second region are spaced apart from each other with respect to the longitudinal axis L of the insulating pipe.

The insulating strip is thus arranged in the region between the insulating sheath and the flange on the insulating pipe, where there is usually a large electric field, which poses an increased risk of partial discharges, owing to the geometry of the high-voltage insulator and the different materials. The insulating strip reduces the electric field strength in the triple-point region. This results in increased impermeability of the high-voltage insulator and thus the best possible shielding against environmental influences and overvoltages, particularly after joint vulcanization of the insulating sheath and the insulating strip.

According to a further embodiment, the insulating sheath is applied by means of an injection-molding process. This means, specifically, that the insulating sheath, including the shielding rings, is preferably produced by encapsulating the insulating pipe with the second insulating material. In addition to the casting process, however, any other suitable methods for producing the insulating sheath that are sufficiently known from the prior art are also possible.

According to another embodiment, the insulating strip is applied by means of an extrusion process. For example, an extruder is used to spray the insulating strip circumferentially onto the insulating pipe rotating about its rotation axis R. Applying the insulating tape by means of extrusion has the advantage from a manufacturing point of view compared to other manufacturing techniques, such as injection for example, that the insulating pipe is exposed to lower pressure forces when applying the insulating strip.

In addition, a high-voltage insulator is specified according to a second aspect of the improved concept.

The features of the high-voltage insulator correspond to the steps of the process according to the first aspect of the improved concept. For the high-voltage insulator according to the second aspect of the improved concept, reference is therefore analogously made to the advantageous explanations, preferred features, technical effects and/or advantages that have already been explained for the method according to the first aspect and the corresponding embodiments of the method. There is no repetition.

The high-voltage insulator comprises a substantially rotationally symmetrical insulating pipe, an insulating sheath, which is arranged circumferentially on the insulating pipe, at least one flange, which is arranged at at least one end of the insulating pipe, and at least one insulating strip, which is arranged circumferentially on the insulating pipe.

According to one embodiment, the insulating pipe is formed from a first insulating material, the insulating sheath and the insulating strip are formed from a second insulating material and the flange is formed from a third material.

According to a further embodiment, the insulating sheath is arranged in a first region of the insulating pipe, the at least one flange is arranged in a second region of the insulating pipe and the at least one insulating strip is arranged in a third region of the insulating pipe. Here, the third region extends at least in part over the first region and/or the second region with respect to a longitudinal axis L of the insulating pipe, and the first region and the second region are spaced apart from each other with respect to the longitudinal axis L of the insulating pipe.

According to a further embodiment, the at least one flange and the insulating sheath together with the insulating pipe form a circumferential groove in which the at least one insulating strip is arranged.

The present disclosure is explained below in detail on the basis of exemplary embodiments with reference to the drawings. Components which are identical or functionally identical or which have an identical effect may be provided with identical reference signs. Identical components or components with an identical function are in some cases explained only in relation to the figure in which they first appear. The explanation is not necessarily repeated in the subsequent figures.

Figure 2:
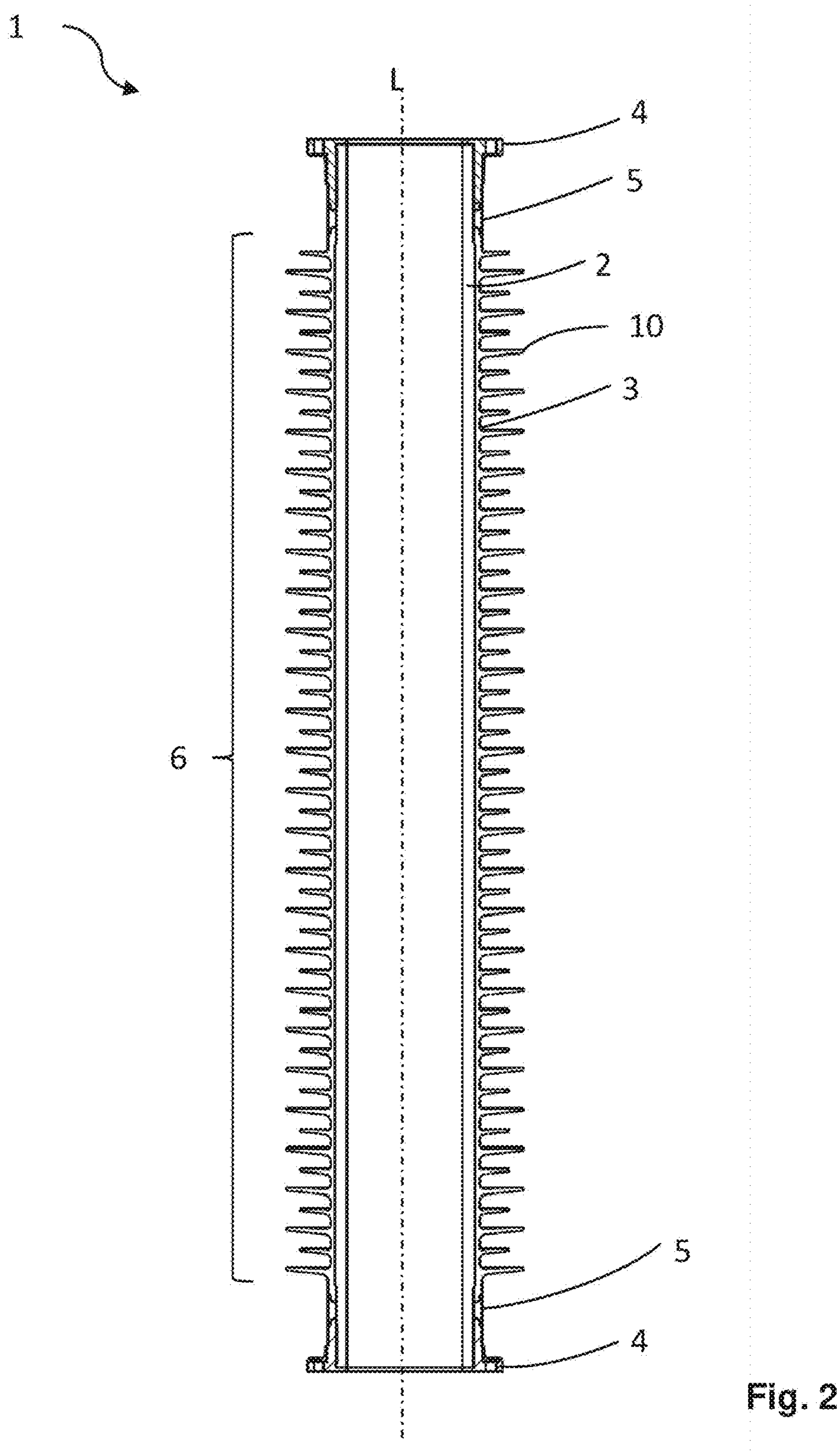
FIG. 2 shows a sectional illustration of the high-voltage insulator from FIG. 1.

FIGS. 1 and 2 show an exemplary embodiment of a high-voltage insulator 1 according to the improved concept, wherein FIG. 1 shows a perspective illustration of the high-voltage insulator and FIG. 2 shows a sectional illustration of the high-voltage insulator.

The high-voltage insulator 1 comprises a substantially rotationally symmetrical insulating pipe 2 made of glass-fiber-reinforced plastic. An insulating sheath 3 with radially extending shielding rings 10 made of HTV silicone is arranged circumferentially on the insulating pipe 2 in a first region 6 with respect to the longitudinal axis L of the insulating pipe 2. A flange 4 made of aluminum is fastened to each of the two ends of the insulating pipe 2. An insulating strip 5 is also arranged circumferentially on the insulating pipe 2 at each of the two ends of the insulating pipe 2 between the respective flange 4 and the insulating sheath 3. The two insulating strips 5 are, like the insulating sheath 3, formed from HTV silicone.

Figure 3:
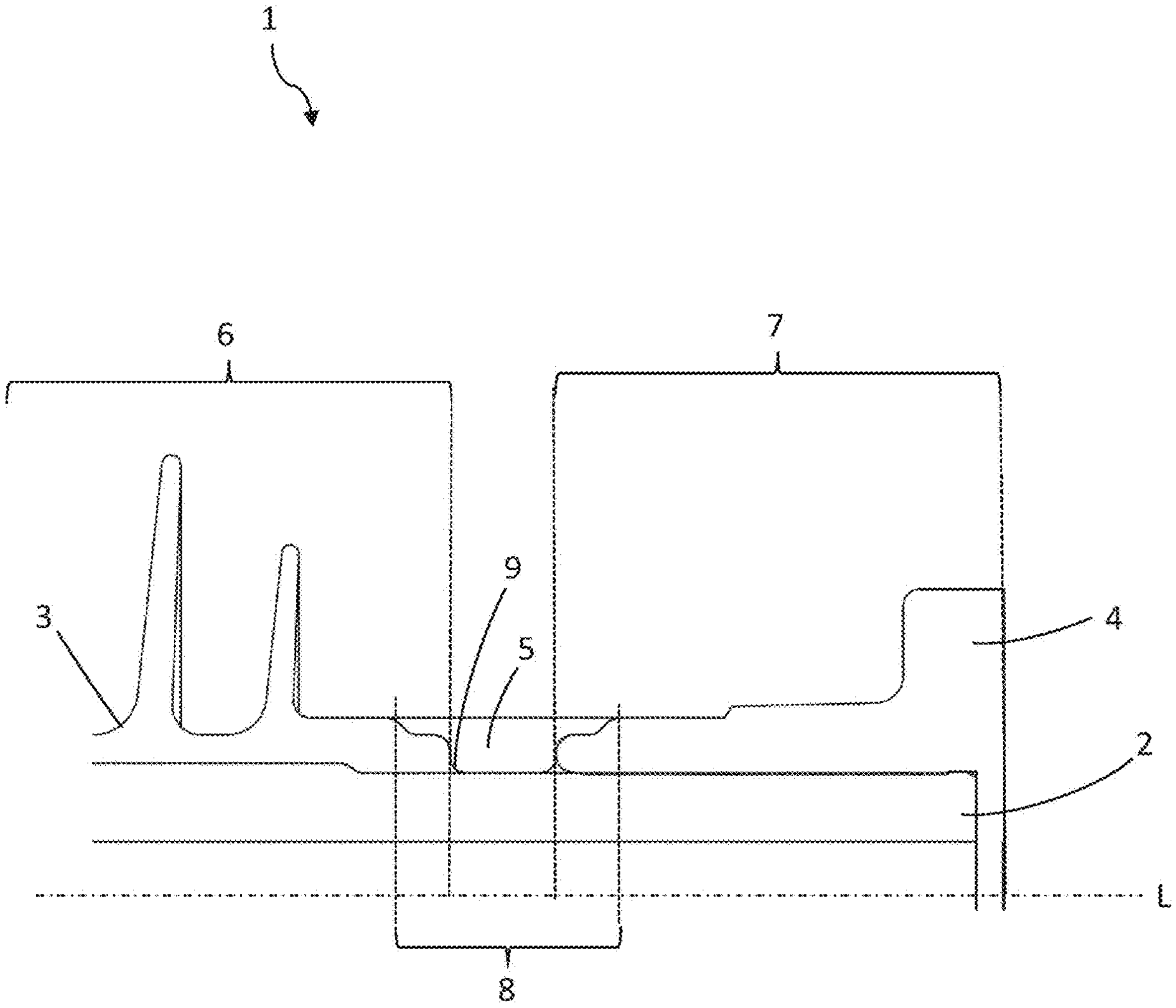
FIG. 3 shows a view of a detail of the high-voltage insulator from FIG. 1 and FIG. 2.

FIG. 3 shows a view of a detail of the high-voltage insulator 1 in section along the longitudinal axis L of the insulating pipe 2. The flange 4 is arranged in a second region 7 with respect to the longitudinal axis L, and the insulating strip 5 is arranged in a third region 8 with respect to the longitudinal axis L. In the first region 6 with respect to the longitudinal axis L of the insulating pipe 2, the insulating pipe 2 is covered with the insulating sheath 3, with only a portion of the region 6, which adjoins the other regions 7 and 8, being shown in this view of a detail. The first region 6 and the second region 7 are spaced apart from each other with respect to the longitudinal axis L, i.e. the insulating sheath 3 and the flange 4 do not touch each other. The insulating pipe 2, the insulating sheath 3 and the flange 4 form a circumferential groove 9 in which the insulating strip 5 is arranged. The third region 8 extends in part over the first and the second region 6 and 7 with respect to the longitudinal axis L, i.e. the insulating strip 5 partially covers the insulating sheath 3 and the flange 4 in order to ensure complete sealing of the triple-point region.

Figure 4:
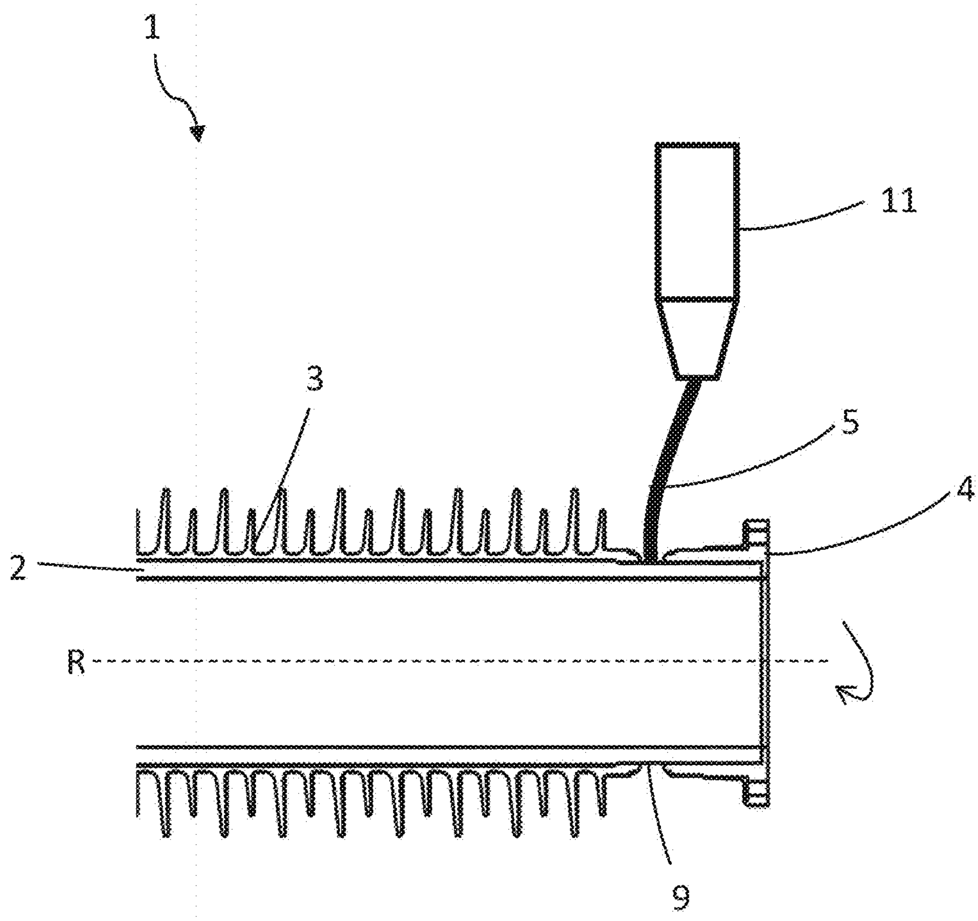
FIG. 4 shows a schematic illustration of a method step of an advantageous embodiment of a method according to the improved concept of the present disclosure.

FIG. 4 shows the application of the insulating strip 5 according to an advantageous embodiment of a method according to the improved concept. The insulating strip 5 is extruded by means of an extruder 11 into the groove 9 on the insulating pipe 2 rotating about a rotation axis R. Here, the amount of applied HTV silicone is dimensioned in such a way that the insulating strip 5 extends over at least a portion of the region 6 in which the insulating sheath 3 is arranged and at least a portion of the region 7 in which the flange 4 is arranged with respect to the longitudinal axis L of the insulating pipe 2. This therefore means, specifically, that the insulating strip 5 is extruded over a portion of the surface of the flange 4 and the insulating sheath 3.

Figure 5:
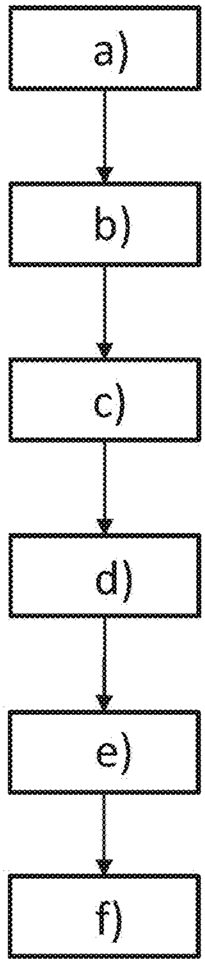
FIG. 5 shows an advantageous embodiment of the method according to the improved concept of the present disclosure.

FIG. 5 shows a flowchart of an advantageous embodiment of a method according to the improved concept. In a step a, a substantially rotationally symmetrical insulating pipe 2 is provided. In a step b, an insulating sheath 3 is applied to the insulating pipe 2. In a step c, at least one flange 4 is fastened to at least one end of the insulating pipe 2. In a step d, at least one insulating strip 5 is applied circumferentially to the insulating pipe 2, preferably by means of an extruder 11. In a step e, the high-voltage insulator 1 is vulcanized. In a step f, the high-voltage insulator 1 is cured.

The present disclosure is not limited by the description based on the embodiments to these embodiments. Rather, the present disclosure comprises any new feature as well as any combination of features, which in particular includes any combination of features in the claims, even if this feature or this combination itself is not explicitly stated in the claims or embodiments.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 High-voltage insulator
2 Insulating pipe
3 Insulating sheath
4 Flange
5 Insulating strip
6 First region of 2
7 Second region of 2
8 Third region of 2
9 Groove
10 Shielding rings of 3
11 Extruder
L Longitudinal axis of 2
R Rotation axis of 2

The invention claimed is:

1. A method for producing a high-voltage insulator, the method comprising:
- providing a substantially rotationally symmetrical insulating pipe;
- applying an insulating sheath to the insulating pipe;
- fastening at least one flange to at least one end of the insulating pipe; and
- applying at least one insulating strip circumferentially to the insulating pipe,
- wherein the insulating sheath and the at least one flange do not touch each other, and
- wherein the at least one insulating strip is arranged between the insulating sheath and the at least one flange on the insulating pipe.

2. The method as claimed in claim 1, wherein:
- the insulating pipe is formed from a first insulating material,
- the insulating sheath and the at least one insulating strip are formed from a second insulating material, and
- the at least one flange is formed from a third material.

3. The method as claimed in claim 1, wherein:
- the insulating sheath is applied in a first region of the insulating pipe,
- the at least one flange is fastened in a second region of the insulating pipe,
- the at least one insulating strip is applied in a third region of the insulating pipe,
- the third region extends, at least in part, over the first region or the second region with respect to a longitudinal axis of the insulating pipe, and
- the first region and the second region are spaced apart from each other with respect to the longitudinal axis of the insulating pipe.

4. The method as claimed in claim 1, wherein:
- the insulating sheath is applied by an injection-molding process, or
- the at least one insulating strip is applied an extrusion process.

5. The method as claimed in claim 1, the method further comprising vulcanizing the high-voltage insulator.

6. The method as claimed in claim 1, wherein fastening the at least one flange to the at least one end of the insulating pipe is with an adhesive.

7. The method as claimed in claim 1, wherein applying the at least one insulating strip circumferentially to the insulating pipe comprises applying the at least one insulating strip circumferentially to a top-most circumferential surface of the insulating pipe.

8. A high-voltage insulator, the high-voltage insulator comprising:
- a substantially rotationally symmetrical insulating pipe;
- an insulating sheath, which is arranged circumferentially on the insulating pipe;
- at least one flange, which is arranged at at least one end of the insulating pipe; and
- at least one insulating strip, which is arranged circumferentially on the insulating pipe,
- wherein the at least one flange and the insulating sheath together with the insulating pipe form a circumferential groove in which the at least one insulating strip is arranged, and wherein the insulating sheath does not touch the at least one flange.

9. The high-voltage insulator as claimed in claim 8, wherein:
- the insulating pipe is formed from a first insulating material,
- the insulating sheath and the at least one insulating strip are formed from a second insulating material, and
- the at least one flange is formed from a third material.

10. The high-voltage insulator as claimed in claim 9 wherein the first insulating material is a glass-fiber reinforced plastic, wherein the second insulating material is a hot-crosslinking silicone rubber, wherein the third material is a metal.

11. The high-voltage insulator as claimed in claim 8, wherein:
- the insulating sheath is arranged in a first region of the insulating pipe,
- the at least one flange is arranged in a second region of the insulating pipe,
- the at least one insulating strip is arranged in a third region of the insulating pipe,
- the third region extends at least in part over the first region or the second region with respect to a longitudinal axis of the insulating pipe, and
- the first region and the second region are spaced apart from each other with respect to the longitudinal axis of the insulating pipe.

12. The high-voltage insulator as claimed in claim 8, wherein:

the at least one flange and the insulating sheath together with the insulating pipe form a circumferential groove in which the at least one insulating strip is arranged.

13. The high-voltage insulator as claimed in claim 8, further comprising shielding rings extending radially outwardly and configured to extend a creepage distance.

* * * * *